United States Patent
Voglesonger

[11] 3,831,278
[45] Aug. 27, 1974

[54] GRASS TRIMMER
[75] Inventor: Harry M. Voglesonger, Riverton, Conn.
[73] Assignee: Dynamics Corporation of America, New York, N.Y.
[22] Filed: Aug. 3, 1972
[21] Appl. No.: 277,658

[52] U.S. Cl.......................... 30/276, 30/347, 56/295
[51] Int. Cl............................................. B26b 27/00
[58] Field of Search............ 30/116, 117, 276, 347; 56/12.7, 295; 28/71.3

[56] References Cited
UNITED STATES PATENTS

| | | | |
|---|---|---|---|
| 2,663,137 | 12/1953 | Asbury | 30/276 X |
| 2,728,973 | 1/1956 | Kummel | 28/71.3 |
| 3,444,674 | 5/1969 | Huff | 56/295 X |
| 3,664,102 | 5/1972 | Reber | 56/295 |
| 3,708,967 | 1/1973 | Geist | 56/12.7 |

FOREIGN PATENTS OR APPLICATIONS

| | | | |
|---|---|---|---|
| 1,118,247 | 6/1968 | Great Britain | 30/276 |
| 1,281,450 | 12/1961 | France | 30/264 |

OTHER PUBLICATIONS

UFO – 8 – 1971 – Brochure distributed by Swissona, 2047 Koper, Sterling Heights, Michigan 48077.

Primary Examiner—Al Lawrence Smith
Assistant Examiner—J. C. Peters
Attorney, Agent, or Firm—Harbaugh and Thomas

[57] ABSTRACT

A pair of stress oriented radially disposed plastic filaments or strands rotated at high speed is employed as the cutting or slicing elements for a manually manipulated grass trimmer including a motor drive, a shroud plate and supporting handle. A convenient form of cutter having an integral hub with diametrically oriented radial strands extending therefrom is disclosed. In one embodiment the molded strands are stress oriented by stretching longitudinally to the extent of their elasticity to increase their strength and reduce the diameter.

10 Claims, 9 Drawing Figures

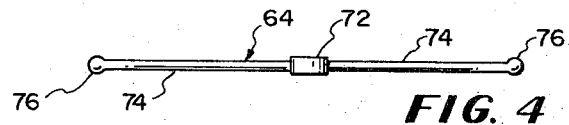
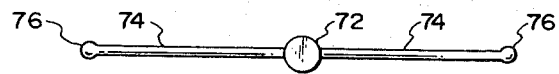
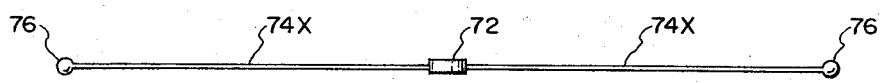
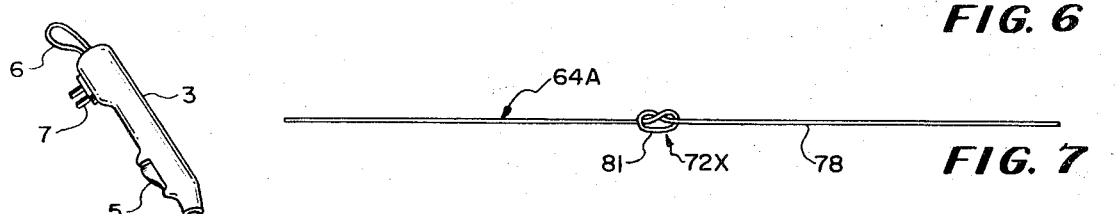
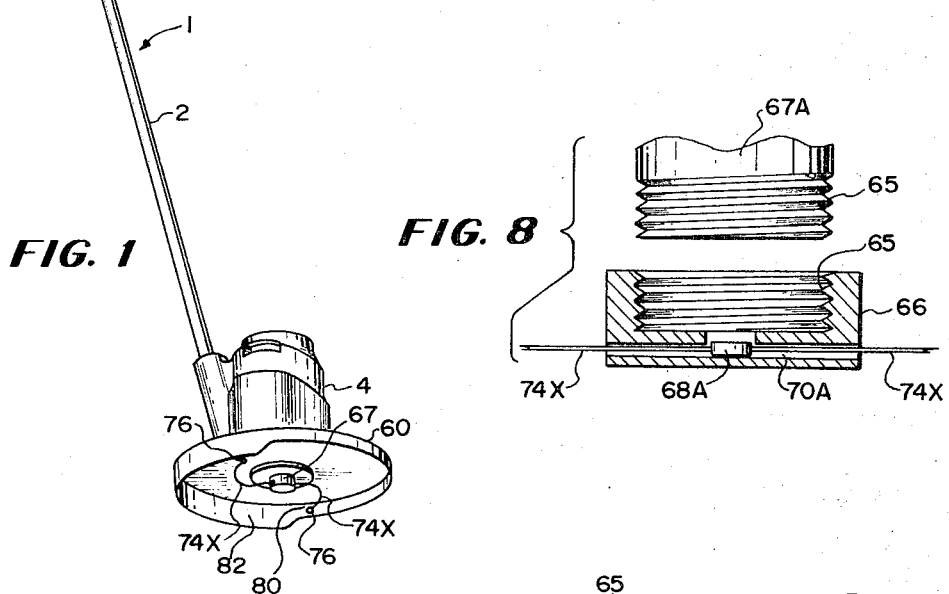
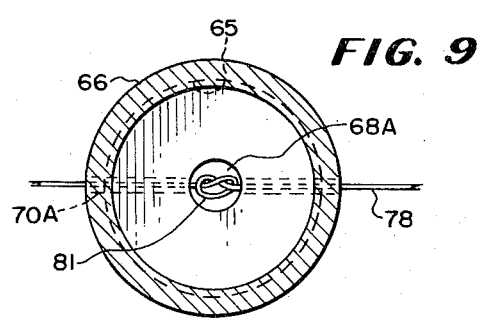

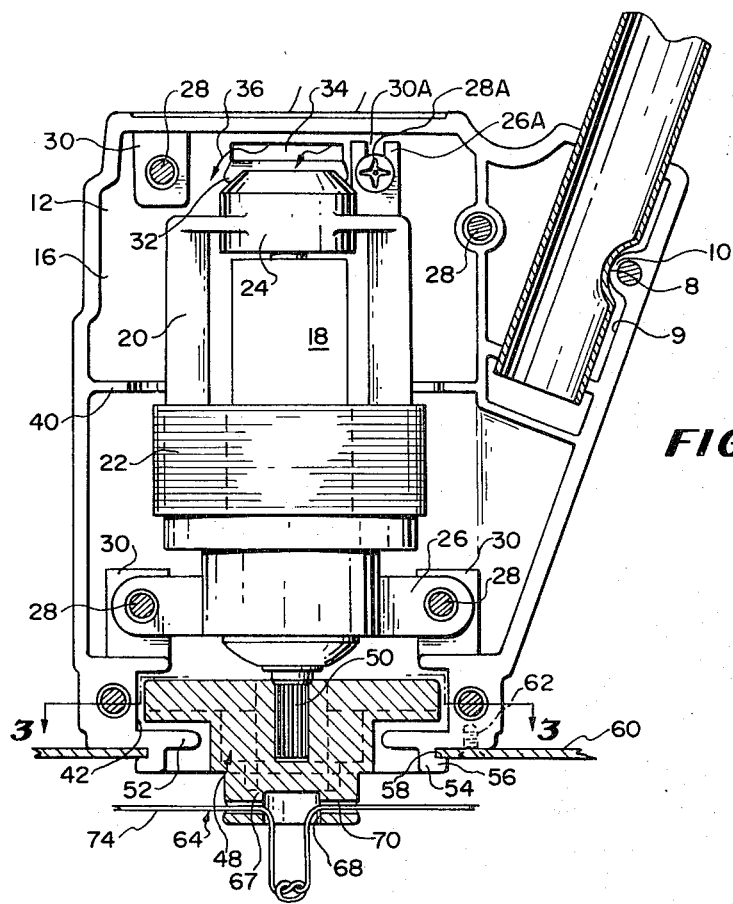
FIG. 2
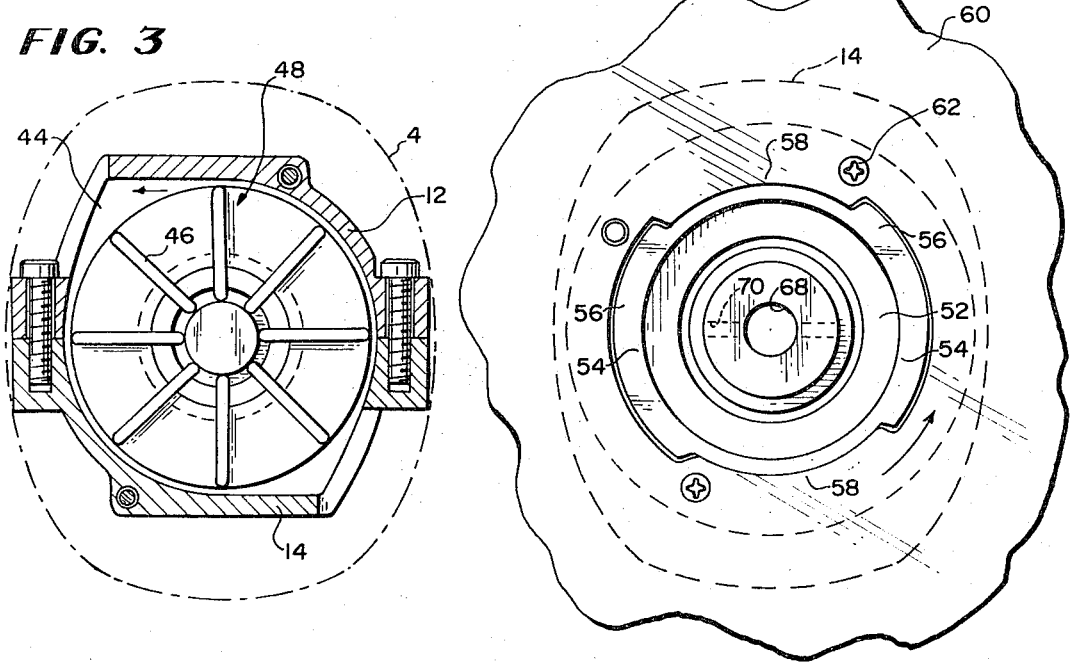
FIG. 3
FIG. 3A

GRASS TRIMMER

BACKGROUND OF THE INVENTION

The blade and housing construction of rotary type mowers has been the subject matter of extensive research and testing in order to extend the life of the blade, provide maximum safety and preserve the cutting efficiency. A number of problems have been present in rotary mower blades. Paramount has been the problem of the rapidly moving blade striking rocks and the like and propelling them or parts thereof to the detriment of the user or bystanders. There is also the ever-present problem of maintaining a sharp cutting edge because of its work wear and exposed condition within the housing.

To overcome the inherent dangers of a rapidly moving blade member various designs of blade mounts and guards have been employed with only limited success. Friction and spring mounts are prone to vibrate. The guard which gives the most protection is most likely to interfere with the cutting action of the blade or form an unwanted receptacle for grass cuttings which subsequently chokes up the rotating blade. Little, if any, attention has been paid to high speed rotation such as by a universal motor for obvious reasons considering the expected dangers involved.

A number of different cutting elements have been employed in this art with the idea of maintaining the sharpness of the blade or providing a flexible cutter element which would not tend to throw rocks and other hard objects. Some attention has been paid to attaining a helical operation of the blade in order to provide even cut and a swirl away of the cut grass for easier collection. With increased blade flexibility, as in nylon blades, it was found that the upward and downward flexing of the blade caused a tendency to gall and break the blade from its central mount. A polyethylene blade, according to U.S. Pat. No. 3,156,082, not only does not throw rocks but is self-sharpening in that any chips that are formed in the blade leave a jagged, though sharp remaining edge. Some blades contain embedded wire cables that are continuously exposed during wear and in this sense are self-sharpening, as in U.S. Pat. No. 3,343,355. Various forms of flexible cutting wires, wire loops, tautened wires, torsion springs and so-called flails made of metal strips, rope, cable, chains, etc., have been used in rotary mowers, lawn edgers and trimmers and in numerous harvesting and material comminuting machinery.

In all of these devices, though some advantage is gained in the manner of mounting the flexible cutting elements, to prevent or mitigate galling, because of the cross-sectional size, weight and substantial rigidity of the cutting elements, the inherent ability to cut, beat, tear or rend the grass or weed stalks is equally effective upon the human hands and feet. The danger of accidents is ever present.

SUMMARY OF THE INVENTION

In accordance with this invention a lightweight, hand held grass trimmer is provided having as the slicing elements, a pair of flexible lightweight filaments or strands of strong, stress-oriented plastic material attached to and extending on opposite sides of a rotatable hub. The hub is driven by a high r.p.m. motor for rotation adjacent to, but spaced from, a shroud plate to provide a mower or lawn edger which overcomes the foregoing difficulties. The dual thread-like slicing elements are totally exposed, except on the motor drive side, and do not inflict injury to the fingers or feet of the user. In one embodiment the slicing elements are provided with an integral plastic hub and each of the diametrically opposite radially disposed strands may be provided with an end bead. The strands are of small diameter and preferably stretch-oriented by elongation to the limit of their molecular elasticity before use. This reduces the diameter of each radial strand and also its strength. The length and strand diameter are such that radial orientation at high rotational speeds is assured.

In the present invention a lightweight, easily handled, grass clipper wand is provided which cuts in any attitude of the driven axis and in any direction of movement laterally of that axis. In one embodiment the disc shield, which is located in a longitudinally spaced relationship from the supporting hub for the strand-like radial slicers is provided with a peripheral flange or leg of limited height and size as a guide for edging close to fixed objects and as a spacer for the slicing elements above the ground. The clipper wand, however, may safely be used without a disc shield if desired.

More specifically the device of this invention comprises an elongated handle with an off-set grip portion and a convenient switch engageable by the finger of the operator. The handle also serves as a protective housing for the electrical cord that is available at its extended end for attachment to a source of AC current. At the other end of the handle a lightweight, high speed, preferably series wound motor is affixed in a suitable housing. The housing with the guide disc or shroud is offset from the longitudinal axis of the handle so that the drive axis of the motor is normal to the ground as the handle or wand is carried in a natural position in front of the operator. The light, flexible, stretch-oriented slicing strands are normally longer than the diameter of the disc, i.e., are long enough to extend beyond the margins of the disc or circular plate when the motor is not running. Upon rotation of the motor at speeds of 20,000 r.p.m. and greater producing 40,000 360° slices a minute, the ends of the slicing elements centrifugate with appreciable force and flex rearwardly in an arc. Under the centrifugal force the outer ends of the elements slice blades of the grass with repeated tangential contact with swiping or wave-like motions. The slicing elements are not subject to extreme wear or fraying and have no tendency to throw solid objects.

In one embodiment the slicing elements are molded as an integral part of a circular hub with or without a central hole to encompass the axis of drive shaft if need be. The slicing elements are provided, in this embodiment, with terminal beads or heads at the ends thereof which facilitate the operation of stretching each of the elements, one against the other, by hand pulling in opposite directions to the extent of the stretch permitted to the radial portions by the material used. This stretching can be accomplished either before or after installation on the drive shaft and the beads assist in the slicing and severing of grass blades.

A PREFERRED EMBODIMENT OF THE INVENTION

For the purpose of illustration, a typical embodiment of the invention is shown in the accompanying drawings in which:

FIG. 1 is a perspective view of the grass trimmer of this invention to show the underside of the housing and slicing element in its relationship therewith during operation;

FIG. 2 is a vertical sectional view of the embodiment shown in FIG. 1 taken on the plane common to the handle and motor axes;

FIG. 3 is a sectional view taken on line 3—3 in FIG. 2.

FIG. 3A is a bottom plan view of the lower end of the housing beneath the disc shield;

FIG. 4 is a side plan view of one form of slicing element prior to stress orientation;

FIG. 5 is a top plan view of the slicing element of FIG. 2;

FIG. 6 is a side plan view of the slicing element of FIGS. 2 and 3 after stress orientation;

FIG. 7 illustrates another form of the slicing element;

FIG. 8 is an exploded view of another form of hub attachment and a fragmentary view of a modified slicing element used therewith; and FIG. 9 is a fragmentary plan view of the slicing element of FIG. 8 in assembled condition within the hub.

DESCRIPTION OF THE PREFERRED EMBODIMENTS

The appended drawings illustrate the preferred embodiments of this invention wherein FIG. 1 shows the grass trimmer 1 having the elongated tubular shaft 2 with an insulating molded grip 3 at one end and a motor housing 4 at the other end. The handle 3 is provided with a switch button 5 at a convenient location on the underside of either right or left hand use. The end of the handle is provided with a hanging strap 6 and adjacent thereto an electrical male plug-in member 7, with or without a short extension section for attachment to an electrical cord (not shown).

The lower end of the handle is offset or indented at 8 (FIG. 2) on the same side as the switch 5 and is closely received in a cavity 9 of the motor housing when assembled with screw bosses 10 resting in the indentation 8 to support the handle at a suitable angle against rotation and removal while it also serves as a conduit for the electrical lead-in wires.

The housing 4 as shown in FIG. 2 is preferably made of two half shells 12 and 14 defining a central cavity 16 in which the series wound motor 18 is mounted which includes a frame 20 supporting the field 22 and journalling the armature at 24. Apertured tabs 26 on the frame 20 are received between matching bosses 30 on the two shells which when closed are held in place by the screws 28 extending through the bosses 30 in the housing assembly. Boss 30A on one housing 12 has a screw 28A separately holding the notch tab 26A as a preliminary step in the assembly.

The housing 4 thus formed has inwardly offset louvres 32 on opposite sides that provide air intake openings 34 for flow as indicated by arrows 36 which cool the motor working parts with radial fins 40 directing flow around the armature and coils.

At its lower end the housing 4 is formed to provide a blower shroud 42 with exhaust openings 44 located opposite radial blower vanes 46 on the upper surface of the drive unit 48 carried by the armature shaft 50 which serves also as a flywheel for purposes to be described. Also in the lower end of the housing the blower 46 is shrouded by a lower wall 52 upon the lower surface of which are formed segmented arcuate flanges 54 having shoulders 56 which serve as one part of a bayonet joint. They receive in supported relation on their shoulders 56 the mating elements 58 provided on the disc shield 60, which when rotated a quarter turn into interengaging relationship with the shoulders 56 are secured by screws 62 threaded in the wall 52.

The flywheel 48 may serve directly as an immediate support for the slicing elements 64 (FIG. 2) or it can be threaded at 65 to receive a cap 66 thereon (FIG. 8) that carries the slicing elements. In FIG. 2 a central hub portion 67 is axially recessed at 68, and provided with radial bores 70, while in FIG. 8 is shown the cap 66 threaded at 65 for the lower 67A end of flywheel and having a central recess 68A with radial bores 70A.

These various parts can be constructed of any suitable material designed for ruggedness, strength and light weight. The strap 6 can be leather, plastic or a nylon cord. The handle grip 3 is preferably made of molded plastic of suitable composition to be both weather resistant and electrically insulating. The shaft 2 can be polished aluminum, suitable reinforced plastic or stainless steel tubing. The motor housing 4, boss 7 and shroud 8 can also be formed of plastic preferably formulated to impart high impact strength, weather resistance and electrical insulating properties.

Referring to FIGS. 4, 5 and 6, wherein one form of slicing element 64 is shown, this element comprises a molded plastic unit having the central hub 72 with a pair of diametrically opposed radial strands 74 on each side with the small balls or knobs 76 at each end. Either before or after installation of the slicing element 64 into the assembly illustrated in FIGS. 2 and 9, the strands 74 are stretched to the limit of their elasticity so that they are elongated to the form 74X as shown in FIG. 6. This operation is readily performed by hand by grasping the ends of the strands 74 at 76 between the thumb and index finger of each hand and pulling until the limit of elasticity is reached. This operation forms the stress oriented strands 74X which are about 4 to 5 times longer than the molded strands 74 and are reduced to about one half or less in diameter. After stretching, the beads 76 can be cut off or left on as desired since they have now served their primary function. The stretching has no effect on the hub 72 or the beads 76, they remain without stress orientation. Actually the hub 72 being thicker resists stretching but is the starting point for the stress orientation on each side thereof.

In FIG. 7 another form of the slicing element 64A is shown comprising a length of plastic filament 78 with a knot 81 tied in the center thereof to make an enlargement 72X.

In mounting the slicing element 64 the bores 70 are large enough that the ends of the strands 74 can be radially threaded outwardly therethrough in opposite directions and the central enlargement 72 then pulled down into the enlargement 68. If this occurs in FIG. 2, the slicing element 64 is ready for operation. If this is done with the cap 66 in FIGS. 8 and 9, then the cap 66 is threaded finger tight into place and it will remain assembled during operation since the threads 65 tighten in the counter direction of rotation (FIG. 1). Preferably the strands 24 are stress oriented before clamping in the hub shown in FIGS. 2 and 8 and accordingly the bores 74 are of a cross-sectional configuration which will receive the stress-oriented slicing elements 78 with or without the beads 76.

Referring back to FIG. 1 the slicing element 64 with its stress oriented strands 74 are shown under the disc shield or shroud 60 in a curved orientation representing their position during rotation at high speed in a counter-clockwise direction as viewed in this drawing. The balls 76 are closely spaced, as at 80, from the inner surface of the flange 82 as they rotate and pass substantially axially under and close to the edge 84 of the smaller flange 86. This allows the slicing elements to be brought up close to or even against stationary objects and effects a cutting action which is practically concentric with the shroud 60. The slicing elements 74 as an illustration, can each be ½ to 1 inch longer than the radius of the shroud 60 when they are not being rotated.

In accordance with this invention the slicing elements 74 in their stress-oriented rotating condition, as one embodiment are about 3 to 4 inches long and have a diameter of about 0.020 to 0.040 inch so that they will have sufficient flexibility and length to attain an arcuate extended radial attitude under a rotational speed of at least about 20,000 r.p.m. These dimensions are not critical to the end result but have been found to be optimum for use of the device for grass trimming. As the length and weight per unit of length of the slicing elements is increased, the tendency to readily assume this radial curved attitude upon rotation is reduced, especially if the elements contact the grass or other objects prior to attaining full speed. Slicing elements shorter than 3 inches can of course be used but their effectiveness upon the grass is lessened because their radial speed is reduced and the wave-like or arcuate slicing attitude is diminished. The diameter of the unstretched strands can be about twice or three times that of the stress-oriented strands, e.g., the diameter of the molded strands 23 can be about 0.040 to 0.080 inch for a 3 inch strand and about 0.060 to 0.12 inch for a 4 inch strand.

A number of thermoplastic elastomeric materials are available which exhibit or can be compounded to exhibit the required toughness, impact strength, abrasion resistance, elongation, tensile strength and resistance to vibration fatigue and stress cracking for use in fabricating the slicing elements 64. Preferably, those plastics which compare favorably with the polyamides (nylon) in these characteristics, especially their ability to be stress-oriented by stretching and their ability to withstand the repeated high speed slicing or wiping contact with grass or broad leafed vegetation are used. Examples of such materials are polypropylene, certain poly vinyl chlorides, monomers, polycarbonates, polystyrene, and acylonitrile-butadiene-styrene copolymers. Those materials having tensile strengths of at least about 7,000 psi (ASTM methods D–638 and D–651), elongations (D–638) of at least 60 percent. Nylon having an elongation of 60 percent or more is the preferred material. The housing and handle parts can be fabricated from either thermoplastic or thermosetting materials which have good impact resistance, electrical insulating properties, etc., as is known in the art. Examples are melamine, phenolics, and polystyrene.

What is claimed is:

1. A lawn trimmer comprising,
   drive means connected to a driven shaft and capable of rotating said shaft at a speed by a motor rated at least about 20,000 r.p.m., and
   a single member mounted at its midpoint to the shaft and providing a pair of radially extending, oppositely oriented slicing elements ranging from 0.020 to 0.040 of an inch thick and approximately 3 to 4 inches long rotated by said driven shaft,
   said slicing elements each comprising elongated single strands of thermoplastic material of sufficient flexibility and length to attain an arcuate extended radial attitude under the rotational speed of said driven shaft.

2. A lawn trimmer in accordance with claim 1 in which,
   a generally circular plate member is disposed about said driven shaft between said drive means and said pair of slicing elements, and
   said elongated member being longer than the effective diameter of said plate member by an amount sufficient to place the ends of the cutter elements substantially coincident with the periphery of said plate member during rotation.

3. A lawn trimmer in accordance with claim 1 in which,
   a housing is provided for said drive means from which said driven shaft projects,
   a generally circular plate member is disposed about the projected driven shaft between said housing and said slicing elements, and
   a shroud flange member is provided on said plate member along a portion of the peripheral edge thereof,
   said shroud flange member extending axially beyond the plane of rotation of said slicing elements.

4. A lawn trimmer in accordance with claim 1 in which,
   said thermoplastic strands comprise an integral molded elongated member having a central enlarged portion affixed to said driven shaft,
   each of said strands being stretched longitudinally to the extent of molecular elasticity from said central portion to a diameter of 0.020 to 0.040 of an inch, and
   the extended length of said strands being 3 to 4 inches long so that upon rotation by said drive means each strand extends radially from the driven shaft in an arc depending opposite to the direction of rotation.

5. A lawn trimmer in accordance with claim 4 in which,
   a generally circular plate member is disposed about said driven shaft between said drive means and said slicing elements, and
   said molded elongated member is of lesser diameter than said plate member by an amount at least as great as the stretch elongation of said strands whereby upon rotation of said stress oriented strands the effective arcuate length of each is substantially the same as the radius of said plate member.

6. A lawn trimmer comprising,

Universal motor drive means connected to a driven shaft and capable of rotating at a speed of at least about 20,000 r.p.m., a pair of radially disposed oppositely oriented slicing elements carried by said driven shaft and extending from 3 to 4 inches from a central portion thereof, a housing for said drive means including a handle for manipulation of the assembly, a generally circular plate member diametrically associated with said housing and disposed radially about said driven shaft between said drive means and said slicing elements, said slicing elements comprising molded strands of thermoplastic material that are stretched longitudinally to the extent of molecular elasticity from said central portion to form stress-oriented strands of increased strength and a reduced diameter of approximately 0.020 to 0.040 of an inch, the extended length of said strands being such that upon rotation by said drive means each strand extends radially from said driven shaft in an arc depending opposite to the direction of rotation and with the tip end portions thereof traveling in a path substantially coincident with the periphery of said plate member to cut grass blades with a slicing action.

7. A lawn trimmer comprising, universal motor drive means connected to a driven shaft and capable of rotating at a speed of at least about 20,000 r.p.m., a pair of radially disposed oppositely oriented slicing elements carried by said driven shaft from a central portion thereof, a housing for said drive means including a handle for manipulation of the assembly, a generally circular plate member diametrically associated with said housing and disposed radially about said driven shaft between said drive means and said slicing elements, said slicing elements comprising molded strands of thermoplastic material that are stretched longitudinally to the extent of molecular elasticity from said central portion to form stress-oriented strands of reduced diameter and increased strength, the extended length of said strands being such that upon rotation by said drive means each strand extends radially from said driven shaft in an arc depending opposite to the direction of rotation and with the tip end portions thereof traveling in a path substantially coincident with the periphery of said plate member, the central portion of said slicing elements comprising a hub member having a central enlargement, said driven shaft including means on its lower end having a central recess receiving said hub member and passages radiating therefrom receiving said strands.

8. A grass trimmer in accordance with claim 6 in which, said slicing elements and said central portion are composed of molded nylon.

9. A lawn trimmer comprising, drive means connected to a driven shaft and capable of rotating said shaft at a speed of at least about 20,000 r.p.m., and a pair of radially disposed oppositely oriented slicing elements carried by said driven shaft, said slicing elements each comprising elongated single strands of thermoplastic material of sufficient flexibility and length to attain an arcuate extended radial attitude under the rotational speed of said driven shaft, said thermoplastic strands comprising an integral molded elongated unit having a central portion affixed to said driven shaft, each of said strands being stretched longitudinally to the extent of molecular elasticity from said central portion and provided with a head at each terminal end, and the extended length of said strands being such that upon rotation by said drive means each strand extends radially from the driven shaft in an arc depending opposite to the direction of rotation.

10. A lawn trimmer comprising, universal motor drive means connected to a driven shaft and capable of rotating at a speed of at least about 20,000 r.p.m., a pair of radially disposed oppositely oriented slicing elements carried by said driven shaft and extending from a central portion thereof, a housing for said drive means including a handle for manipulation of the assembly, a generally circular plate member diametrically associated with said housing and disposed radially about said driven shaft between said drive means and said slicing element, said slicing elements comprising molded strands of thermoplastic material that are stretched longitudinally to the extent of molecular elasticity from said central portion to form stress-oriented strands of reduced diameter and increased strength, the extended length of said strands being such that upon rotation by said drive means each strand extends radially from said driven shaft in an arc depending opposite to the direction of rotation and with the tip end portions thereof traveling in a path substantially coincident with the periphery of said plate member, said slicing elements and central portion comprising a molded integral unit having enlargements at the ends of said strands, the molded diameter of said strands being at least about three times greater than the diameter of said strands after stretch orientation and the length of each of said strands being about one-quarter of the extended length after stretching.

* * * * *